United States Patent [19]

Teggatz et al.

[11] 3,716,794

[45] Feb. 13, 1973

[54] FREQUENCY DIVIDING APPARATUS

[75] Inventors: Eugene D. Teggatz, Vincent R. De Long, Dale A. Holtzer, all of Marion, Iowa

[73] Assignee: Collins Radio Company, Dallas, Tex.

[22] Filed: April 26, 1972

[21] Appl. No.: 247,628

[52] U.S. Cl. ..........................328/39, 328/41, 331/51

[51] Int. Cl. ..............................................H03k 21/00

[58] Field of Search .....331/51; 307/225; 328/39, 37, 328/51, 48

*Primary Examiner*—John Kominski

*Attorney*—Bruce C. Lutz et al.

[57] ABSTRACT

Apparatus for altering the frequency of a signal by values other than whole number division comprising the use of an adder and a register for consecutively and cumulatively adding an input number at a rate coincident with the frequency of a signal to be frequency divided and providing an output indicative of each occurrence of the cumulative sum exceeding a predetermined value.

5 Claims, 1 Drawing Figure

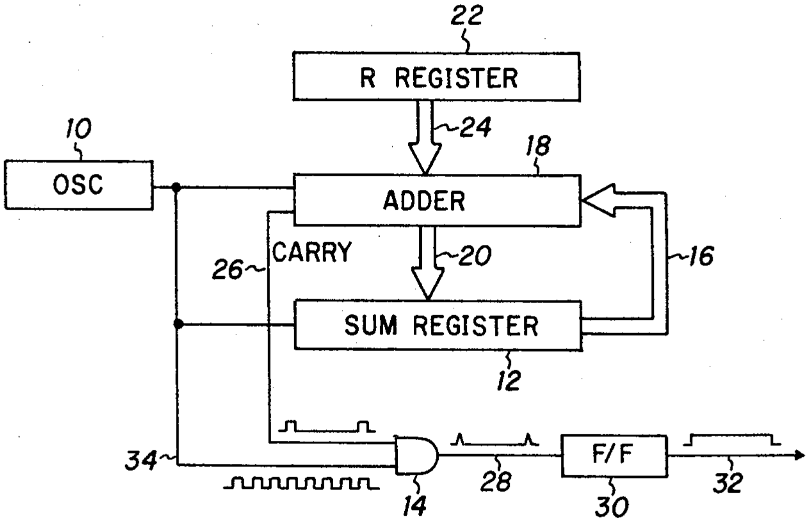
22
R REGISTER
24
10
OSC
18
ADDER
CARRY
20
26
16
SUM REGISTER
12
34
14
28
F/F
30
32

FREQUENCY DIVIDING APPARATUS

The present invention is directed generally to electronics and more specifically to apparatus for digitally frequency dividing a signal.

The prior art has shown many means for dividing the frequency of a signal but in general these frequency dividers have operated on a whole number and analog frequency dividing basis. In other words, the normal method is to clock one or more flip-flops by a basic frequency to be divided so that the resulting output is one-half, one-fourth, one-eighth, etc. of the input signal. Special apparatus has also been devised for dividing by one-third and other whole numbers.

As far as is known, however, we have been the first to provide a simple method for dividing by some number other than a whole number.

The present invention operates to divide a given frequency signal by using the basic signal to actuate an adding process which consecutively and cumulatively adds a given number in a unit having a predetermined capacity until the capacity is exceeded. At the time that the capacity is exceeded, an output is provided. This output is representative of a function of the number being cumulatively added and the signal to be frequency divided. If the number being cumulatively added is represented by a decimal number, the overflow occurs at a rate equivalent to the multiplication of the decimal number times the frequency of the signal to be divided. It may be desired that the output signal be synchronous with the signal being frequency divided in which case the output from the adding network can be ANDed with the signal being divided so that the output is in synchronism therewith. Further, the signal may be passed through a wave shaping network such as a flip-flop to provide an alternating output having a frequency which is one-half the frequency of the ANDed output signal.

It is therefore an object of the present invention to provide an improved frequency dividing apparatus.

Further objects and advantages of the present invention will be apparent from a reading of the specification and appended claims in conjunction with the drawing which comprises a single block diagram representation of the invention.

In the figure an oscillator 10 is illustrated providing signals to a sum register 12, an AND gate 14 and an adder 18. The sum register 12 has a parallel output 16 supplying signals to one input of adder 18. A parallel output 20 of adder 18 supplies input signals to the sum register 12. An R register 22 supplies signals in parallel via a path designated as 24 to a second input of adder 18. A carry or overflow output 26 of adder 18 supplies further signals to AND gate 14. An output of AND gate 14 is supplied on a line 28 to a flip-flop 30 which has an output 32.

As indicated, the lines 16, 20 and 24 are shown in parallel. However, the apparatus will operate, although frequency limitations will set in sooner, by having these various inputs supplied serially rather than in parallel. The present embodiment is merely a preferred version.

In operation the oscillator 10 supplies clocking signals to the AND gate 14. At first, however, there is no input from adder 18. For the purposes of illustration it may be assumed that the frequency of the signal from oscillator 10 is 10,000 cycles per second. For ease of illustration it may be assumed that the number in R register 22 is the decimal equivalent of one-fourth or 0.250. This, in fact, is the number assumed for the waveforms shown in the figure. The first occurrence of a given characteristic such as positive zero crossing of the clock shown adjacent lead 34 connecting oscillator 10 to the adder 18 will act to add the output of R register 22 to the output of sum register 12. Since it may be assumed that sum register 12 did not have a number contained therein, the number 0.25 will be added to 0. Thus, after the occurrence of the first clock pulse, the number in sum register 12 will be 0.25. Upon the occurrence of the second clock pulse the adder 18 will now add 0.25 from R register 22 with 0.25 from sum register 12. The sum register will now have a total result after addition of 0.50. Upon the occurrence of the third clock the adder 18 will add 0.25 from register 22 with 0.50 from sum register 12. The sum register 12 after the addition operation in 18 will now contain a number representative of 0.75. Upon the occurrence of the next clock pulse the adder 18 will provide a 0 output since the summation would not be representative of 1.00. The 0 output will be supplied to sum register 12 and an output will be supplied on overflow line 26. Thus, upon the occurrence of the next clock pulse from oscillator 10, an output will be provided at the output of AND gate 14. The first clock output from AND gate 14 will set flip-flop 30 to a condition which as shown would be a positive output. The next clocked output from AND gate 14 will change the flip-flop 30 again. Thus, the output from flip-flop 30 is an alternating signal which occurs at a frequency rate which in this case would be one-eighth the frequency of the oscillator 10. The reason that this frequency is one-eighth is that the flip-flop 30 produces another division by two from the frequency of the signal supplied by the AND gate 14.

As will be realized, digital numbers were used in the illustration. Binary numbers would normally be used in the various registers and the digital number representation was used for convenience and clarity in description.

If the number in R register were 0.15, the frequency of the signal appearing at line 28 would be 1,500 cycles per second. On the other hand, if the number in R register were 0.99, the frequency of the signal appearing at output 28 would be 9,999 cycles per second. In each of these examples there will still be a remainder passed to the sum register 12 in a majority the occurrences of a carry signal appearing on line 26.

As will be observed, as long as the number in register 22 is representative of a fraction, the output on line 28 will be indicative of that fraction in register 22 times the frequency of the signal being supplied from oscillator 10.

The oscillator 10 may be any signal supplying means having a frequency which should be divided. The register 22 as well as register 12 may be devices for storing binary numbers such as Model SF50 from Sylvania. The full adder 18 can be a device such as Model 8260 from Signetics Corporation. The AND gate and flip-flop are easily available to anyone skilled in the art.

The present device is usable in many different applications and one application in particular is for providing the output on line 28 to a frequency synthesizer one example of which is indicated as Model MN350 as supplied by Micro Networks Corporation of Worcester Massachusetts. Any such frequency synthesizer such as referenced above from Micro Networks Corporation operates properly in response to various frequency input signals but it is the source of varying frequency signals which is a problem to supply. The present invention will provide such a variable frequency of almost infinitesimal changes depending upon the capacity of the registers 12, 18, and 22. Another recognized advantage of the invention is the generation of new frequencies with relatively low values of spurious sidebands. Further, these sidebands can be minimized for a particular application by the optimum selection of circuit parameters.

While we have described one embodiment of the invention, other embodiments will be obvious to those skilled in the art and we wish to be limited not by the invention as described above but only by the scope of the appended claims wherein we claim:

1. Frequency dividing apparatus comprising, in combination:

signal supplying first means for providing a signal to be divided in frequency;

signal supplying second means for supplying a signal representative of a digital number;

sum register means, including clocking input means connected to said first means, digital number input means and digital number output means, said sum register means having a predetermined digital capacity;

adder means including a first input connected to said second means for receiving signals therefrom, a second input connected to said output of said sum register means, a third input connected to said first means for receiving signals therefrom, an output means connected to said digital number input of said sum register means for supplying signals representative of the sum of the signals supplied at said first and second inputs of said adder means, and overflow means, said adder means having a capacity substantially the same as said predetermined capacity of said sum register and an output signal being supplied on said overflow means each time the capacity of said adder is exceeded, the frequency of occurrence of said overflow signal being representative of a frequency divided version of the signal from said first means.

2. Apparatus as claimed in claim 1 comprising, in addition:

AND gate means connected to receive signals from said first means and from said overflow means of said adder means, the output from said AND gate means occurring in synchronism with the signals from said first means and upon each occurrence of an overflow from said adder means.

3. Apparatus as claimed in claim 2 comprising in addition:

flip-flop means connected to the output of said AND gate means, an output of said flip-flop means providing an alternating signal of a frequency which is lower than the frequency of the signal provided by said first means and is a function of the signal provided by said second means.

4. The method of reducing the frequency of a signal comprising the steps of:

supplying a first signal to be frequency divided;

supplying a digital second signal which has a numerical value representative of the division to be applied to said first signal;

cumulatively adding the digital number upon each occurrence of a recurring characteristic of the signal to be divided; and providing an output signal upon each occurrence of the cumulative sum exceeding a predetermined value while keeping the excess for further cumulative adding operations.

5. The method of claim 4 comprising the additional step of:

producing a signal which varies in amplitude upon each occurrence of the signal obtained from said cumulative adding step to provide an alternating signal indicative of a division of the signal to be frequency divided.

* * * * *